United States Patent
Sidhu et al.

(10) Patent No.: US 7,200,824 B1
(45) Date of Patent: Apr. 3, 2007

(54) PERFORMANCE/POWER MAPPING OF A DIE

(75) Inventors: Lakhbeer Sidhu, Fremont, CA (US); Irfan Rahim, San Jose, CA (US)

(73) Assignee: Altera Corporation, San Jose, CA (US)

( * ) Notice: Subject to any disclaimer, the term of this patent is extended or adjusted under 35 U.S.C. 154(b) by 280 days.

(21) Appl. No.: 10/990,663

(22) Filed: Nov. 16, 2004

(51) Int. Cl.
*G06F 17/50* (2006.01)
*G06F 19/00* (2006.01)
*H03K 19/003* (2006.01)
*H01L 25/00* (2006.01)

(52) U.S. Cl. .................. 716/5; 716/6; 716/7; 716/16; 716/18; 700/97; 700/108; 700/121; 326/38; 326/47; 326/101

(58) Field of Classification Search ............ 716/5, 716/6, 7, 16, 18; 700/97, 108, 21; 326/38, 326/47, 101
See application file for complete search history.

(56) References Cited

U.S. PATENT DOCUMENTS

| | | | |
|---|---|---|---|
| 5,359,535 A * | 10/1994 | Djaja et al. ................ | 716/6 |
| 6,036,345 A * | 3/2000 | Jannette et al. ............ | 700/97 |
| 6,970,758 B1 * | 11/2005 | Shi et al. ................... | 700/108 |
| 6,971,079 B2 * | 11/2005 | Yee et al. ................... | 716/6 |
| 2002/0133792 A1 * | 9/2002 | Raghunathan et al. ...... | 716/4 |
| 2004/0054975 A1 * | 3/2004 | Yee et al. ................... | 716/6 |
| 2005/0007147 A1 * | 1/2005 | Young ........................ | 326/41 |
| 2005/0085932 A1 * | 4/2005 | Aghababazadeh et al. .... | 700/90 |

FOREIGN PATENT DOCUMENTS

| EP | 1061447 A2 * | 12/2000 |
|---|---|---|
| JP | 59003651 A * | 1/1984 |
| JP | 02307266 A * | 12/1990 |

OTHER PUBLICATIONS

NN9303349, "Architectural Support and On-Chip Hardware for Flexible System Performance Monitoring via Software", IBM Technical Disclosure Bulletin, vol. 36, No. 3, Mar. 1, 1993, pp. 349-352 (6 pages).*

(Continued)

*Primary Examiner*—Phallaka Kik
(74) *Attorney, Agent, or Firm*—Beyer Weaver & Thomas LLP

(57) ABSTRACT

Methods and apparatus are provided for harnessing the effects of process variations in a semiconductor device. In one example, implementing an electronic design based on collected performance parameters is provided. In general, a core is segmented into multiple core regions. A performance parameter can be collected from each of the core regions. The performance parameter can be collected with a performance measuring mechanism associated with the core region. The performance parameter can be correlated to the performance requirements of an electronic device portion, and the electronic design portion can be implemented in a core region that has a performance parameter matched to the needs of the electronic design portion. In this way, process variation effects are harnessed by optimizing the implementation of the electronic design in regions of the semiconductor device best suited the needs of each electronic design portion. Therefore, performance/power optimization of the semiconductor device can be realized.

23 Claims, 6 Drawing Sheets

OTHER PUBLICATIONS

Altera Corporation, 2 page document entitled Process Change Notification PCN0413, Additional Wafer Fabrication Site (FAB 14), Jul. 1, 2004, PCN0413, http://www.altera.com/literature/pcn/pcn0413.pdf.

Altera Corporation, 1 page document entitled "Process Technology Strategy", Oct. 27, 2004, http://www.altera.com/support/devices/reliablility/reports-tools/process/rel-technology-strategy.html.

Altera Corporation, 2 page document entitled, "Quartus II PowerPlay Power Analysis & Optimization Technology", Copyright 1995-2005, http://www.altera.com/products/software/products/quartus2/design/qts-power_analysis.html.

Altera Corporation, 3 page document entitled "Stratix II 90-nm Silicon Power Optimization", Copyright 1995-2005, http://www.altera.com/products/devices/stratix2/features/st2-power.html.

Altera Corporation, 1 page document entitled "PowerPlay Early Power Estimators & Power Analyzer", Copyright 1995-2005, http://www.altera.com/support/devices/estimator/pow-powerplay.html.

Altera Corporation, 30 page document entitled "Quartus II Handbook, vol. 3, 8. PowerPlay Power Analyzer", Dec. 2004, qii53013-1.0, http://www.altera.com/literature/hb/qts_qii53013.pdf.

* cited by examiner

PERFORMANCE/POWER MAPPING OF A DIE

BACKGROUND OF THE INVENTION

1. Field of the Invention

The present invention relates to semiconductor devices. More specifically, the present invention relates to techniques and mechanisms for harnessing the effects of process variations in semiconductor devices.

2. Description of Related Art

In forming semiconductor devices, a variety of manufacturing processes are employed. Some of these manufacturing processes include among others deposition, doping, and etching. Generally, the processes are applied in a sequential order over a semiconductor wafer in forming multiple semiconductor devices.

However, despite efforts to form semiconductor devices that conform exactly to their designs, process variations often cause semiconductor devices to deviate from their designs. As such, many semiconductor devices do not have uniform performance characteristics. In general, process variations refer to elements of process variability that lead to different characteristics in the semiconductor devices. For example, even though identical circuits are implemented within a semiconductor device, performances in the circuits between different regions within the semiconductor device may vary due to process variations.

Consequently, improved methods and apparatus for harnessing the effects of process variations in semiconductor devices would be highly beneficial.

SUMMARY OF THE INVENTION

Methods and apparatus are provided for harnessing the effects of process variations in semiconductor devices. The effects of process variations can be measured and used in a number of ways. In one example, performance parameters are collected and used to implement an electronic design in a semiconductor device.

In implementing an electronic design in a semiconductor device, the core of the semiconductor device can be divided into multiple core regions. Each core region will typically have an associated performance measuring mechanism where a performance parameter can be collected. The performance parameters can be used for determining which portion of an electronic design should be implemented in the corresponding core regions. As such, the optimization of the electronic design can be realized by implementing the portion of the electronic design in the core region best suited to its operation.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1A:
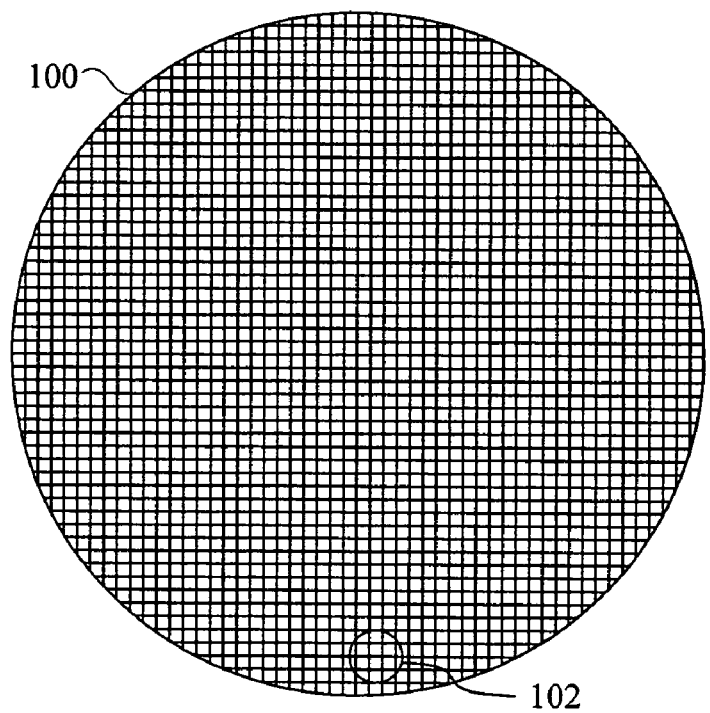
FIG. 1A illustrates a wafer populated with semiconductor devices according to various embodiments of the present invention.

The present invention will now be described in detail with reference to a preferred embodiment thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention. Further, it should be noted that the techniques of the present invention can be applied to a variety of types of semiconductor devices such as programmable devices and application-specific integrated circuit (ASIC) devices.

Methods and apparatus are provided for harnessing the effects of process variations in a semiconductor device. In one example, implementing an electronic design based on collected performance parameters is provided. In general, a core is segmented into multiple core regions. A performance parameter can be collected from each of the core regions. The performance parameter can be collected with a performance measuring mechanism associated with the core region. The performance parameter can be correlated to the performance requirements of an electronic device portion, and the electronic design portion can be implemented in a core region that has a performance parameter matched to the needs of the electronic design portion. In this way, the effects of process variations are harnessed by optimizing the implementation of the electronic design in regions of the semiconductor device best suited the needs of each electronic design portion. As such, performance/power optimization of the semiconductor device can be realized.

As mentioned, process variations are generally elements of process variability that lead to different characteristics in the semiconductor device. For example, differences in the implants may lead to different threshold voltages (Vt) whereas differences in photolithographic patterning steps (e.g., deposition) can lead to different poly thicknesses, gate oxide thicknesses, or dielectric thicknesses, which in turn may lead to other different performance characteristics. Process variations can be categorized into two groupings. A first grouping is directed towards the device. These include a variety of device parameters such as L poly (gate poly length), gate oxide, Vt, differences in photolithography, critical dimension (CD), or implants, etc. A second grouping is directed towards the interconnects. These include metal sheet resistance (SR), critical dimension (CD), inter-layer dielectric (ILD), inter-metal dielectric (IMD), etc.

Process variations can occur due to wafer scale processing differences (e.g., processing temperatures, manufacturing equipment limitations, wafer placement, etc.). Process variations can also occur between die-to-die, lot-to-lot, wafer-to-wafer, or within each semiconductor device itself. These process variations result in fluctuations in the electrical properties of the semiconductor devices, which translate to variations in semiconductor device performance parameters. Semiconductor device performance parameters may include speed/time delay, power, device leakage, and etc. These performance parameters can be affected by process variations such as L poly and Vt differences for example. As will be discussed below, techniques and mechanisms can be used to mitigate or to take advantage of the effects of process variations.

In general, the term "electronic design" refers to the logical structure of an electronic device such as an integrated circuit or a portion of the device. It may be implemented in hardware (usually referred to herein generically as a "semiconductor device" or a "target hardware device"). During the design and development effort, an electronic design may exist in various states or stages. These may include a high level Boolean representation (encoded in a hardware design language for example), a schematic or circuit representation, or any other form representing the logical arrangement of a device. In addition to the circuit structure and behavioral descriptions, the electronic design may specify other details such as floor-plan constraints, waveform constraints, timing constraints, fitting constraints, etc. At the gate level, it may exist as a netlist (whether synthesized or not) prior to placement on a target hardware device. Alternatively, it may include completed place and route assignments.

Figure 1B:
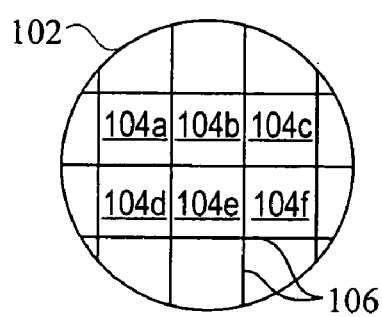
FIG. 1B illustrates an enlarged portion of the wafer in FIG. 1A.

Reference will now be directed to FIG. 1A, which illustrates a wafer 100 populated with semiconductor devices 104 according to various embodiments of the present invention. FIG. 1B illustrates an enlarged portion 102 of wafer 100 in FIG. 1A. As shown, semiconductor devices 104 are bare dice formed on wafer 100. In one embodiment, semiconductor devices 104 are programmable devices. Any number of suitable methods or techniques may be used to form the semiconductor devices 104. In general, semiconductor devices 104 are formed on wafer 100 in such a manner that their total count can be maximized. Each semiconductor device (e.g., 104a, 104b, 104c, 104d, 104e, and 104f) is defined with saw lines 106 along its edges. Saw lines 106 are used to separate semiconductor devices 104 from each other.

Figure 2:
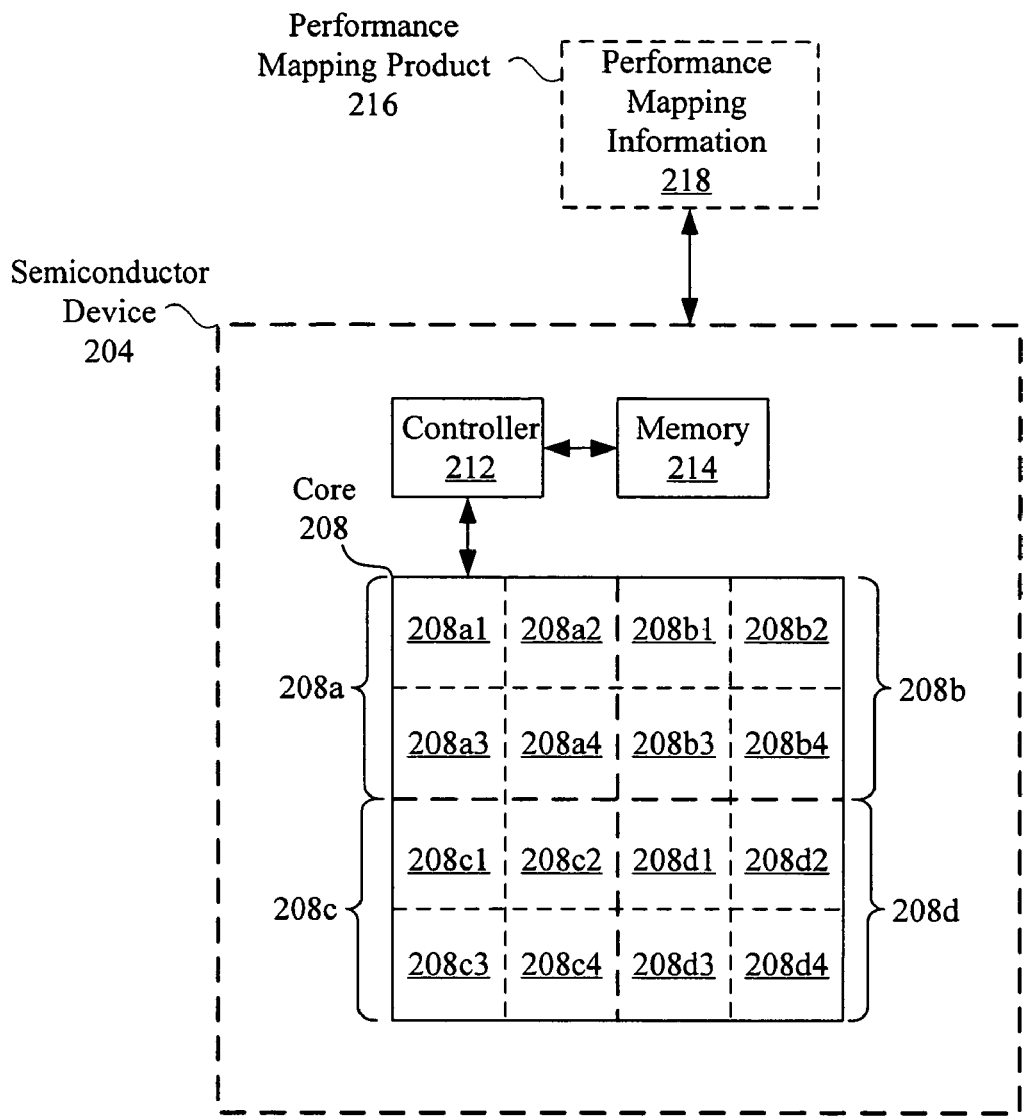
FIG. 2 illustrates a block diagram of a semiconductor device having a core segmented into multiple core regions according to various embodiments of the present invention.

Referring to FIG. 2, a block diagram of a semiconductor device 204 having a core 208 segmented into multiple core regions (e.g., 208a(1–4), 208b(1–4), 208c(1–4), 208d(1–4)) according to various embodiments of the present invention is illustrated. Core 208 typically includes a portion of semiconductor device 204 where an electronic design can be implemented. The electronic design may either be soft coded or hard coded in semiconductor device 204. In some embodiments, core 208 includes multiple transistors for implementing the electronic design. In other embodiments, core 208 may include arrayed logic blocks.

Segmentation of core 208 into core regions can be done in any number of ways and at any level, using any suitable technique. For example, core 208 can be segmented based on user inputs or on a predefined set of rules. In one embodiment, core 208 is segmented simply into quadrants (e.g., 208a, 208b, 208c, 208d). Each quadrant can further be segmented again (e.g., 208a1, 208a2, 208a3, 208a4). Typically, the number or core regions segmented from core 208 is based on the size of semiconductor device 204. It will be appreciated by one of skill in the art that the segmentation may be done for a core of an individual semiconductor device or for multiple cores of interrelated semiconductor devices as a group, in which an electronic design can be implemented for maximizing function allocation. That is, segmentation can be done at the individual semiconductor device level or at the wafer level.

Figure 3A:
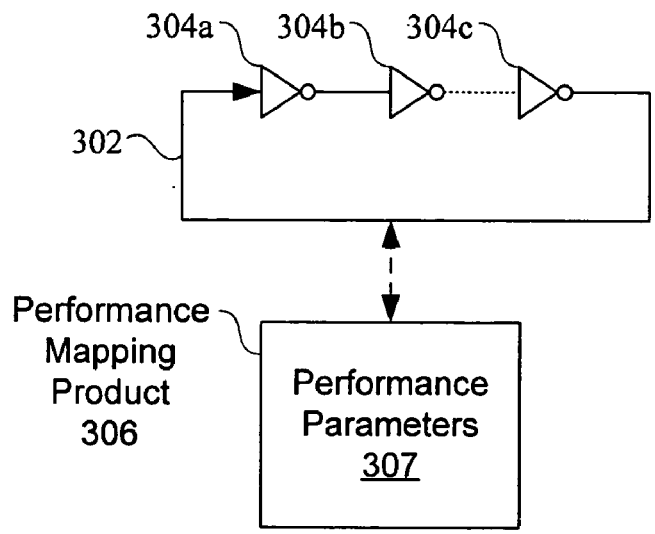
FIG. 3A illustrates a performance measuring mechanism according to one embodiment of the present invention.
Figure 3B:
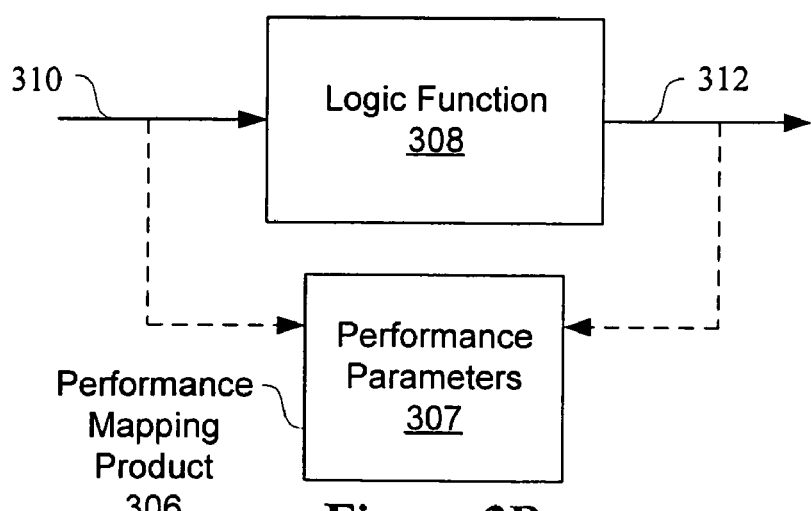
FIG. 3B illustrates a performance measuring mechanism according to another embodiment of the present invention.

Each core region 208 will generally have an associated performance measuring mechanism. Typically, the performance measuring mechanism is implemented in core regions 208 before the final electronic design is implemented in core 208. Furthermore, the performance measuring mechanism can be implemented permanently or temporarily in core 208. For example, as in a programmable device, the performance measuring mechanism can be removed by reprogramming the programmable device. It should be noted that any number/type of performance measuring mechanism may be used. Some examples are shown in FIGS. 3A and 3B below. In general, performance measuring mechanisms are operable to facilitate measurement of performance parameters. Performance parameters may include speed/time delay, power, device leakage, etc. In general, performance parameters can be correlated to a process variation. Further, any number of performance parameters may be measured. Even one measured performance parameter can be useful.

Semiconductor device 204 further includes a memory 214 operable to record performance mapping information 218, which typically includes the measured performance parameters. Memory 214 can be any conventionally available memory, such as flash memory, EEPROM, or any other suitable memory. Which memory to use may depend on the current technology process node. Memory 214 can be located anywhere on semiconductor device 204. Typically, memory 214 is non-volatile memory (e.g., poly fuses) so that the performance mapping information can be stored for a period of time.

Memory 214 can also be accessed for updating and storing the latest performance mapping information. Memory 214 facilitates the ability to implement an electronic design based on the performance mapping information in semiconductor device 204 after semiconductor device 204 has been formed. For instance, semiconductor device 204 may be formed and shipped to a user for implementing an electronic design therein. The user may use an electronic device automation (EDA) tool to access the performance mapping information stored in memory 214 and to program the electronic design in semiconductor 204 based on the performance mapping information. Thus, accessing and using the measured performance parameters for maximizing performance of the semiconductor device is possible. In addition, recording performance mapping information facilitates the adaptation of future architectural possibilities for semiconductor devices.

Referring back to FIG. 2, semiconductor device 204 also includes a controller 212. Controller 212 can be any suitable controller used for semiconductor devices. According to various embodiments, controller 212 is operable to access both core 208 and memory 214. Controller 212 may further monitor or collect the performance parameters from the performance measuring mechanisms. In one embodiment, controller 212 is integrated with a performance mapping product 216. As such, controller 212 may share many of the same functions encompassed in performance mapping product 216.

Performance mapping information 218 is typically performance parameter information associated with the core regions. Performance mapping information may include unprocessed performance parameter information such as a listing of the measured performance parameters. In addition, performance mapping information may include processed performance parameter information such as an analysis or a characterization of measured performance parameters. Characterization of measured performance parameters may be done using a variety of methods. For example, a characterization based on NMOS and PMOS can be done for a CMOS transistor. Although the characterization can be based on each transistor, it may be more practical (due to the number of transistors on a die/wafer) to average the characterization by averaging the measured performance parameters across several transistors in a segmented region.

In general, performance mapping information 218 is generated from performance mapping product 216. According to one embodiment, performance mapping product 216 is embedded in software, such as an EDA tool. One example of an EDA tool is the Quartus Development Tool, which is available from Altera Corporation of San Jose, Calif. According to another embodiment, the performance mapping product is embedded in hardware located on the semiconductor device. For example, the performance mapping product can be embedded in controller 212. The performance mapping product is operable to interface either directly or indirectly with the controller, memory, core and/or the performance measuring mechanisms.

Performance mapping product 216 is generally integrated into a mechanism (e.g., EDA tool) for implementing an electronic design. The performance mapping product can be operable to segment the core into multiple core regions, wherein each core region has an associated performance measuring mechanism. The performance mapping product can also be operable to collect either directly or indirectly a performance parameter from each of the performance measuring mechanisms. For example, the performance mapping product can collect a performance parameter via any suitable probing mechanism. Further, the performance mapping product can be operable to characterize each core region based on the collected performance parameters in generating one example of performance mapping information. According to various embodiments, performance mapping information can be accessed by either controller 212 or a mechanism (e.g., EDA tool) for implementing an electronic design where utilization of one of the multiple core regions for implementing a portion of an electronic design based on the performance mapping information can be performed.

The use of performance measuring mechanisms allows the ability to characterize spatial variations across core 208. Typically, performance measuring mechanisms are implemented in intensive and identical delay paths. FIG. 3A illustrates a performance measuring mechanism according to one embodiment of the present invention. As shown, the performance measuring mechanism is a ring oscillator. The ring oscillator includes an odd number of cascaded inverters 304. The output of the cascaded inverters 304 is fed back in a loop 302 to the input of the cascaded inverters 304. As such, oscillation of a signal each time it feeds back into the group of inventors is possible.

A performance mapping product 306 may be used to measure any number of performance parameters 307 such as the ring oscillator's frequency or the cascaded inverters' time delay, which are proportional to speed. On the other hand, current may be measured during oscillations to determine power. The measured performance parameter 307 may provide an indication of the degree of process variations present in the semiconductor device. For instance, the faster the ring oscillator rings, the greater the possibility that the gate poly is short and the Vt is low. Performance mapping product 306 may be operable to measure a performance parameter 307 either indirectly or directly from the performance measuring mechanism. For example, performance mapping product 306 can measure performance parameters by probing the performance measuring mechanism during a semiconductor device fabrication stage, such as the sorting stage.

FIG. 3B illustrates a performance measuring mechanism according to another embodiment of the present invention. As shown, the performance measuring mechanism is a logic function 308 with an input 310 and an output 312. Based on logic function 308, output 312 can be compared to a known input 310. The comparison can be processed by performance mapping product 306 in collecting a performance parameter 307. For instance, the comparison can provide the processing delay/speed of logic function 308.

It is important to note that the present invention is adaptable to future technologies, especially since cross-die variations are often getting larger and increasing problems. Typically, the larger the die size, the more possibilities for variations to occur from one edge of the die to another edge of the die. Further, the process differences between the various sectors on the die/wafer are exacerbated as the die/wafer size increases. On the other hand, for 65 nm and beyond technology nodes, process variations in poly CD (e.g., gate length), metal CD, VT, IMD thickness, etc. will result in non-optimal device performance/power consumption behavior. Various factors can contribute to these problems. These factors include the complexity and amount of transistors present in the semiconductor device. Other factors include the quality of manufacturing control. For instance, it is generally more difficult to maintain the quality of manufacturing control at the same rate as advancements in technology allow features on a semiconductor device to become smaller.

Figure 4:
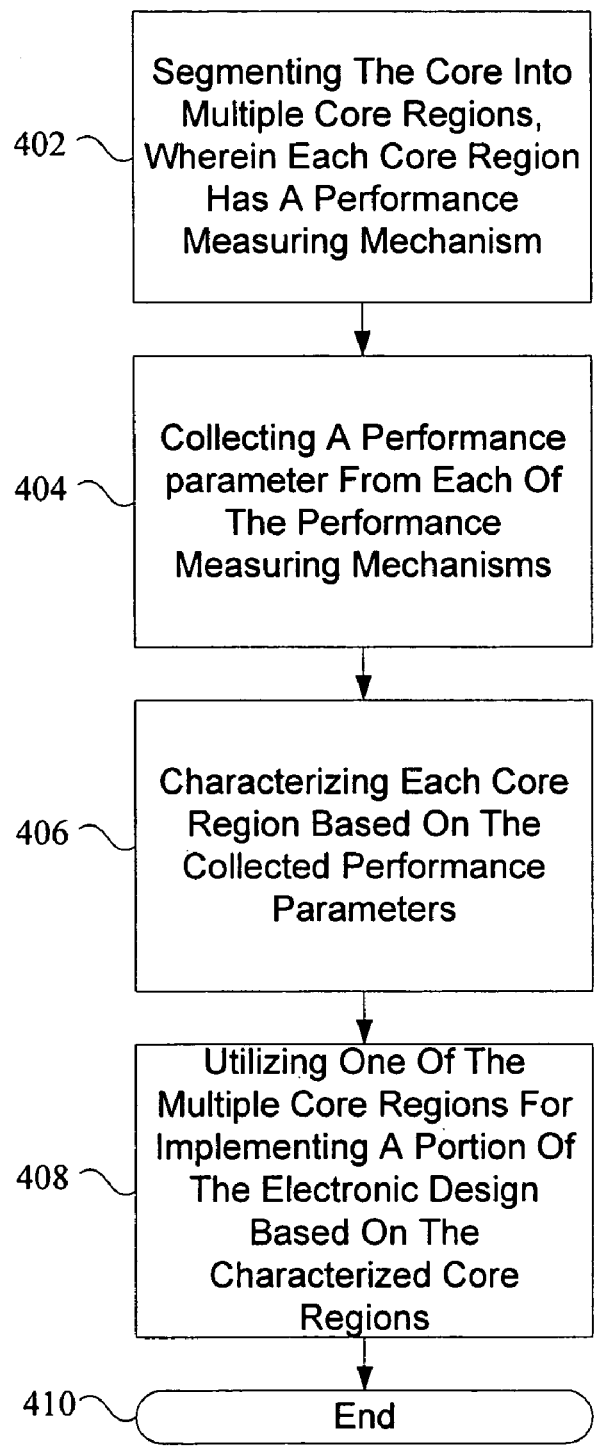
FIG. 4 illustrates a flowchart for implementing an electronic design in a semiconductor device according to various embodiments of the present invention.

To further elaborate, FIG. 4 illustrates a flowchart for implementing an electronic design in a semiconductor device according to various embodiments of the present invention. Typically, the semiconductor device includes a core. Therefore, the flowchart begins by segmenting the core into multiple core regions in operation 402. Each core region should have an associated performance measuring mechanism. If the performance measuring mechanism is not present, it can be implemented (e.g., programmed into the core regions) at this time. Any performance measuring mechanism may be used to provide performance information. In one embodiment, the performance measuring mechanism is a ring oscillator. In another embodiment, the performance measuring mechanism is a logic function. The performance measuring mechanism used depends on the desired performance parameter sought for each particular application.

Segmenting the core may be done using any suitable method. For instance, segmenting the core may include dividing the core into core regions based on the semiconductor device's size. That is, as compared to dice of various sizes, more core regions may result for a larger die size. In one embodiment, the core is segmented into two or more core regions. In general, the core includes an area for implementing an electronic design. The core may even be user configurable for implementing the electronic design. In one embodiment, the core includes arrayed logic blocks. In another embodiment, the core includes multiple transistors.

This invention is particularly advantageous where the semiconductor device is a programmable logic device.

Next, collecting a performance parameter from each of the performance measuring mechanisms may be performed in operation 404. Collecting the performance parameters may include measuring the performance parameters with the performance measuring mechanisms and recording the measured performance parameters to a memory. Any performance parameter may be collected provided that they can be measured. In one embodiment, performance parameters include some indication of speed, power, device leakage, or time delay. Typically, the memory used for recording the collected performance parameters is non-volatile memory. As such, the recorded performance parameters may be retrieved at a later time.

After performing operation 404, characterizing each core region based on the collected performance parameters may be performed in operation 406. Characterizing each core region may include categorizing each core region based on the collected performance parameters as well as their relative strengths. For example, as the performance parameters relate/compare to one another, a core region can be designated as fast and another core region as slow. The core region designated as fast can be used to implement a portion of the electronic design that requires a faster response (e.g., circuits in the critical path such as DSP circuits). On the other hand, the core region designated as slow can be used to implement a portion of the electronic design that requires a slower response (e.g., circuits not in the critical path such as memory blocks recording data for future use). The core region can also be designated as typical. Characterization of each core region is included in the performance mapping information 218. As such, the characterization of each region can be recorded and stored in memory 214.

Next, utilizing one of the multiple core regions for implementing a portion of the electronic design based on the characterized core regions can be performed in operation 408. In one embodiment, utilizing one of the multiple core regions for implementing the portion of the electronic design based on the characterized core regions includes accessing the memory for the characterized core regions; selecting the portion of the electronic design for implementation in one of the multiple core regions based on the characterized core regions; and implementing the selected portion of the electronic design in one of the multiple core regions. In another embodiment, utilizing one of the multiple core regions for implementing the portion of the electronic design based on the characterized core regions includes optimizing the electronic design by implementing the portion of the electronic design in the core region that is best suited to its operation. Finally, the flowchart ends at operation 410.

It should be noted that any of the operations in the flowchart of FIG. 4 can be removed, replaced, repeated, or rearranged. For example, characterizing each core region based on the collected performance parameters in operation 406 can be omitted or combined integrally with operation 404. As such, operation 408 may include utilizing one of the multiple core regions for implementing a portion of the electronic design based on either the collected performance parameters or characterized core regions. As another example, operation 408 can be repeated until every portion of the electronic design is implemented.

It should be further noted that operations 402, 404, and 406 are generally performed after the semiconductor device has be fabricated, but before an electronic design has be implemented. For instance, operations 402, 404, and 406 can be performed during a sorting stage (e.g., wafer level) or a final testing stage (e.g., individual cut die level) or after the individual die is packaged. On the other hand, operation 408 is generally performed when an electronic design is to be implemented in a fabricated semiconductor device. As such, operation 408 can be performed by the factory or by the user.

Figure 5:
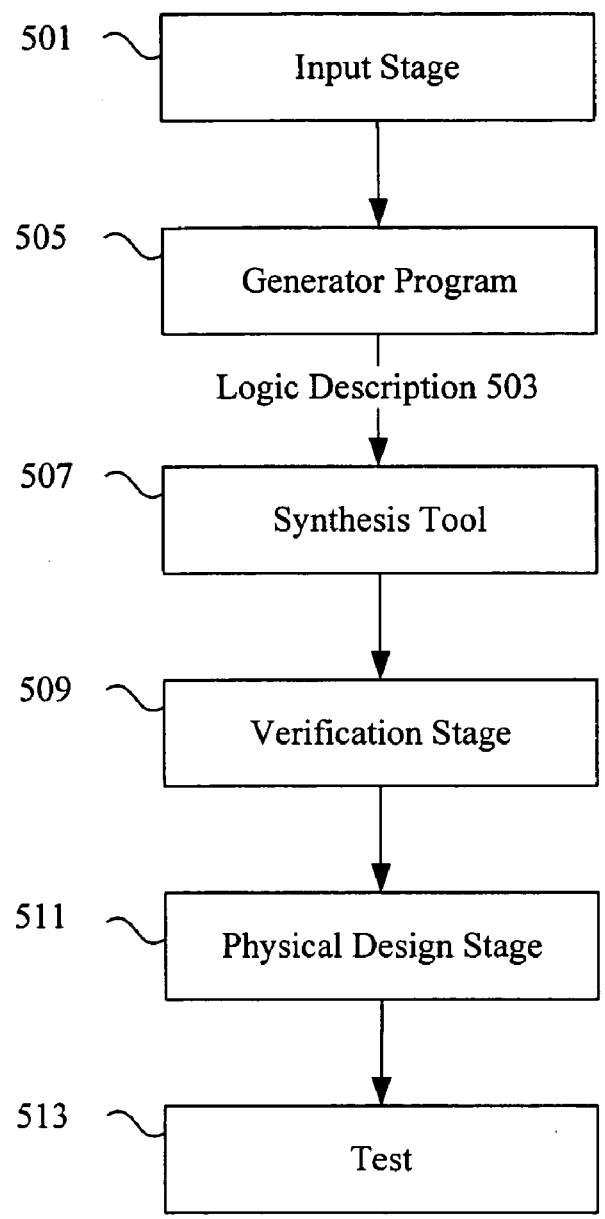
FIG. 5 is a diagrammatic representation showing implementation of a programmable device.

FIG. 5 is a diagrammatic representation showing implementation of an electronic device using a programmable device tool. An input stage 501 receives selection information typically from a user for logic such as a processor core as well as other components such as a streaming output device to be implemented on an electronic device. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various components selected.

In typical implementations, the generator program 505 can identify the selections and generate a logic description with information for implementing the various components. The generator program 505 can be a Perl script creating HDL files such as Verilog, Abel, VHDL, and AHDL files from the component information entered by a user. According to various embodiments, the generator program 505 also provides information to a synthesis tool 507 to allow HDL files to be automatically synthesized. In some examples, a logic description is provided directly by a designer. Some of the available synthesis tools are Leonardo Spectrum, available from Mentor Graphics Corporation of Wilsonville, Oregon and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oregon and Synplify available from Synplicity Corporation of Sunnyvale, Calif. Various synthesized netlist formats will be appreciated by one of skill in the art.

A verification stage 509 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 509, the synthesized netlist file can be provided to physical design tools 511 including place and route and configuration tools. A place and route tool typically locates logic cells on specific logic elements of a target hardware device and connects wires between the inputs and outputs of the various logic elements in accordance with logic required to implement an electronic design. The device can also be physically tested at 513.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used in implementing various techniques of the present invention. For example, operation 408 can be performed during place and route procedures.

As noted above, different stages and programs can be integrated in a variety of manners. According to one embodiment, the input stage 501, the generator program 505, the synthesis tool 507, the verification tools 509, and physical design tools 511 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Generally, embodiments of the present invention employ various processes or methods involving data stored in or transferred through one or more computing devices.

Embodiments of the present invention also relate to an apparatus for performing these operations. For example, one embodiment is an apparatus that has a performance mapping product in accordance with this invention.

Structurally, the apparatus may be specially constructed or it may be a general-purpose computer selectively activated or reconfigured by a computer program and/or data structure stored in the computer. The processes presented herein are not intrinsically related to any particular computer or other apparatus. Various general-purpose machines may be used with programs written in accordance with the teachings herein, or it may be more convenient to construct a more specialized apparatus to perform the required method operations. A particular structure generally representing a variety of these machines will be described below.

Figure 6:
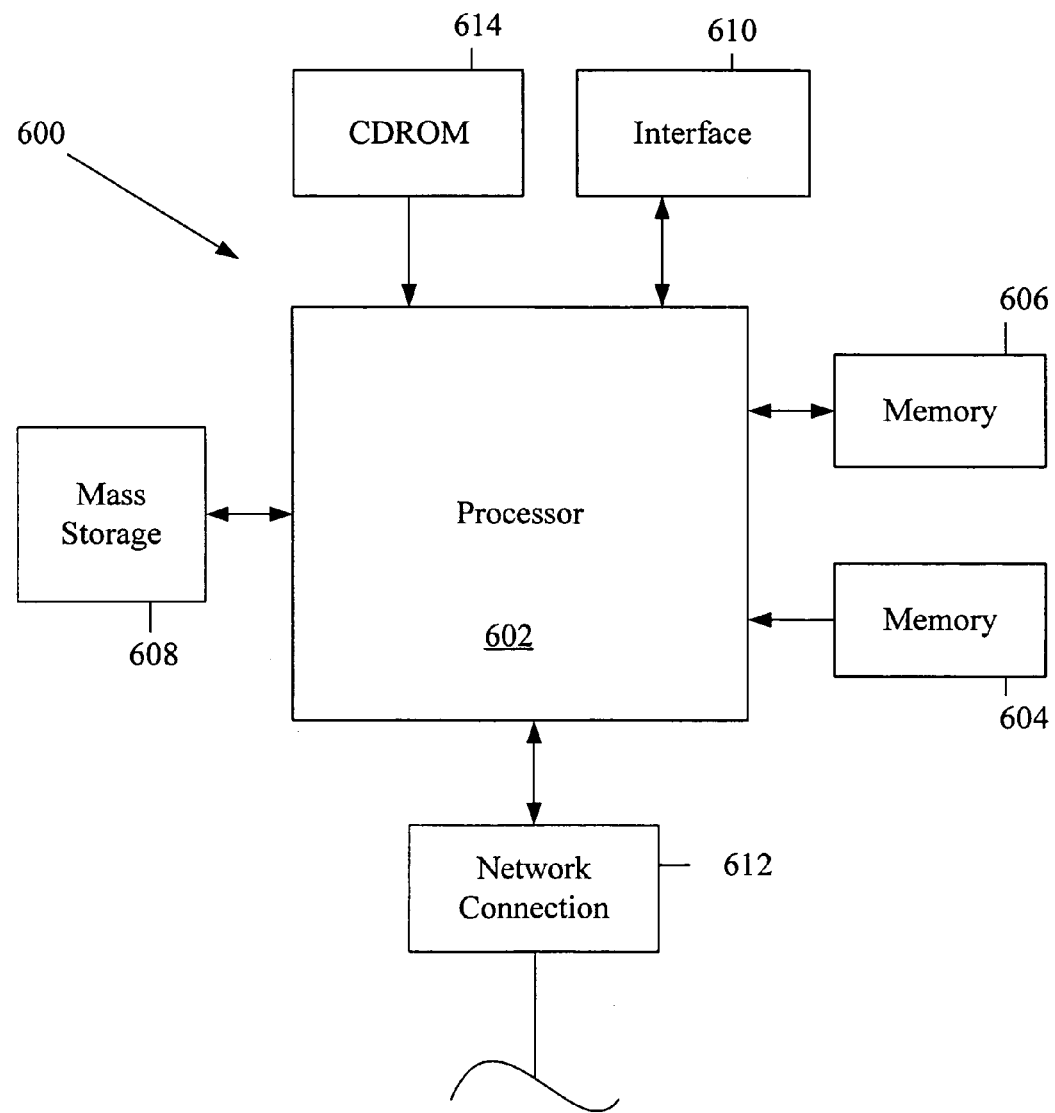
FIG. 6 is a diagrammatic representation of a system that can be used to implement the programmable device.

FIG. 6 illustrates a typical computer system that can be used to implement a programmable device having an electronic design configured according to various embodiments of the present invention. The computer system 600 includes any number of processors 602 (also referred to as central processing units, or CPUs) that are coupled to devices including memory 606 (typically a random access memory, or "RAM"), memory 604 (typically a read only memory, or "ROM"). The processors 602 can be operable to access the performance mapping information and utilize one of the multiple core regions for implementing a portion of an electronic design based on the performance mapping information. As is well known in the art, memory 604 acts to transfer data and instructions uni-directionally to the CPU and memory 606 is used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. It should be noted that the system 600 may also be associated with devices for transferring completed designs onto a programmable device. The above-described devices and materials will be familiar to those of skill in the computer hardware and software arts.

It should be noted that the present invention provides many advantages. For instance, with the performance mapping information, voltages of the electronic design can be adjusted accordingly such that the semiconductor device can appear to have uniform performance throughout the core. In a variable voltage architecture (e.g., where multiple voltages such as Vg, Vcc, Vss, and Vsub can be individually set), the present invention allows the optimal setting of the voltages in each of the core regions. Adjusting the voltages accordingly to the performance mapping information can accommodate across-die variations, thereby making a semiconductor device appear to the user to have uniform performance. The implementation of the electronic design can be done to maximize high speeds and minimize power requirements, thereby, lowering costs and improving performances in a system. Moreover, the present invention becomes more advantageous as the size of the semiconductor device increases. According to one embodiment, the present invention is advantageous for semiconductor devices having a size of 24 mm×32 mm or larger.

As mentioned earlier, the present invention may be applied to any semiconductor device. However, the present invention is particularly advantageous for programmable devices. This is because functions of the electronic design can be flexibly programmed or reprogrammed into specific locations that can improve the effectiveness of the functions. For example, functions that needs to be done faster can be implemented into a particular section of the semiconductor device that performs faster. In another example, continual monitoring (e.g., via controller 212) of performance parameters allows the semiconductor device to adapt as they change (e.g., a performance parameter may change while the semiconductor device is running under operating conditions).

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for implementing an electronic design in a semiconductor device having a core, comprising:
    segmenting the core into a plurality of core regions, wherein each core region has a performance measuring mechanism;
    collecting a performance parameter from each of the performance measuring mechanisms; and
    utilizing one of the plurality of core regions for implementing a portion of the electronic design based on the collected performance parameters.

2. The method of claim 1, further comprising:
    characterizing each core region based on the collected performance parameters; and
    recording the characterized core regions to a memory.

3. The method of claim 2, wherein the memory is non-volatile memory.

4. The method of claim 2, wherein utilizing one of the plurality of core regions for implementing the portion of the electronic design based on the collected performance parameters comprises:
    accessing the memory for the characterized core regions;
    selecting the portion of the electronic design for implementation in one of the plurality of core regions based on the characterized core regions; and
    implementing the selected portion of the electronic design in the one of the plurality of core regions.

5. The method of claim 4, wherein the performance parameters are selected from the group consisting of speed, power, device leakage, and time delay.

6. The method of claim 1, wherein utilizing one of the plurality of core regions for implementing the portion of the electronic design based on the collected performance parameters comprises:
    optimizing the electronic design by implementing the portion of the electronic design in the core region best suited to its operation.

7. The method of claim 1, wherein segmenting the core comprises dividing the core into core regions based on the semiconductor device's size.

8. The method of claim 1, wherein the semiconductor device is a programmable logic device.

9. The method of claim 1, wherein the performance measuring mechanisms are selected from the group consisting of a ring oscillator and a logic function.

10. A computer program product for implementing an electronic design in a semiconductor device having a core, the computer program product comprising:
    a computer usable medium having program instructions embodied therein, the program instructions comprising:
    instructions for segmenting the core into a plurality of core regions, wherein each core region has a performance measuring mechanism;
    instructions for collecting a performance parameter from each of the performance measuring mechanisms; and
    instructions for utilizing one of the plurality of core regions for implementing a portion of the electronic design based on the collected performance parameters.

11. The computer program product of claim 10, wherein instructions for collecting the performance parameters comprises:
    instructions for measuring the performance parameters via the performance measuring mechanisms; and
    instructions for recording the measured performance parameters to a memory.

12. The computer program product of claim 11, wherein the memory is non-volatile memory.

13. The computer program product of claim 11, wherein instructions for utilizing one of the plurality of core regions for implementing the portion of the electronic design based on the collected performance parameters comprises:
    instructions for accessing the memory for the measured performance parameters;
    instructions for selecting the portion of the electronic design for implementation in one of the plurality of core regions based on the measured performance parameters; and
    instructions for implementing the selected portion of the electronic design in the one of the plurality of core regions.

14. The computer program product of claim 13, wherein the performance parameters are selected from the group consisting of speed, power, device leakage, and time delay.

15. The computer program product of claim 10, wherein instructions for utilizing one of the plurality of core regions for implementing the portion of the electronic design based on the collected performance parameters comprises:
   optimizing the electronic design by implementing the portion of the electronic design in the core region best suited to its operation.

16. The computer program product of claim 10, wherein the core comprises an area for implementing an electronic design.

17. The computer program product of claim 16, wherein the core is user configurable for implementing the electronic design.

18. The computer program product of claim 17, wherein the core comprises arrayed logic blocks.

19. The computer program product of claim 17, wherein the core comprises multiple transistors.

20. A semiconductor device, comprising:
   a core;
   a memory having recorded performance mapping information, the performance mapping information generated from a performance mapping product operable to:
      segment the core into a plurality of core regions, wherein each core region has a performance measuring mechanism; and
      collect a performance parameter from each of the performance measuring mechanisms in generating the performance mapping information; and
   a controller operable to access the performance mapping information and utilize one of the plurality of core regions for implementing a portion of an electronic design based on the performance mapping information.

21. The semiconductor device of claim 20, wherein the performance mapping product is further operable to:
   characterize each core region based on the collected performance parameters in generating the performance mapping information.

22. The semiconductor device of claim 20, wherein the performance mapping product is embedded in software.

23. The semiconductor device of claim 20, wherein the performance mapping product is embedded in hardware located on the semiconductor device.

* * * * *